US012555473B1

(12) United States Patent
Busby

(10) Patent No.: US 12,555,473 B1
(45) **Date of Patent: *Feb. 17, 2026**

(54) TRAFFIC SIGNALING SYSTEM

(71) Applicant: Joseph Patin Busby, Bakersfield, CA (US)

(72) Inventor: Joseph Patin Busby, Bakersfield, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/820,091

(22) Filed: Aug. 29, 2024

Related U.S. Application Data

(63) Continuation-in-part of application No. 18/627,227, filed on Apr. 4, 2024, now Pat. No. 12,104,757.

(51) Int. Cl.
*G08G 1/095* (2006.01)

(52) U.S. Cl.
CPC .................................... *G08G 1/095* (2013.01)

(58) Field of Classification Search
CPC ...................................................... G08G 1/095
See application file for complete search history.

(56) References Cited

U.S. PATENT DOCUMENTS

| | | | | | |
|---|---|---|---|---|---|
| 3,903,500 | A * | 9/1975 | Denes | G08G 1/095 340/928 |
| 10,672,268 | B1 * | 6/2020 | Weader | G09F 13/005 |
| 2002/0118122 | A1 * | 8/2002 | Madanat | G08G 1/095 340/815.4 |
| 2004/0008127 | A1 * | 1/2004 | Manavi | G08G 1/096 340/906 |
| 2005/0088319 | A1 * | 4/2005 | Madanat | G08G 1/095 340/907 |

* cited by examiner

*Primary Examiner* — Alexander K Garlen
(74) *Attorney, Agent, or Firm* — Plager Schack LLP; Mark H. Plager; Naomi Mann

(57) ABSTRACT

A traffic signaling system comprises a traffic light that includes an inner light arrangement, and an outer light arrangement bordering the inner light arrangement. The inner light arrangement comprises a red inner light, an amber inner light, and a green inner light which are linearly arranged; the outer light arrangement comprises at least one of a red tube light, an amber tube light, and a green tube light; and an inner light in the inner light arrangement illuminates simultaneously with a tube light of a matching color in the outer light arrangement during an active state for the respective color.

16 Claims, 4 Drawing Sheets

TRAFFIC SIGNALING SYSTEM

RELATED APPLICATION

This application is a continuation-in-part of U.S. application Ser. No. 18/627,227 filed Apr. 4, 2024, which is incorporated by reference herein in its entirety.

BACKGROUND

The present disclosure relates generally to traffic lights and traffic light systems.

A typical traffic light may include three linearly arranged color signals, i.e., red, yellow (also known as amber), and green, which are used to communicate information associated with traffic rules to road users for controlling traffic. As is well known, green is commonly used to indicate that traffic may proceed through the intersection, while red indicates that traffic may not enter the intersection. Amber is generally used to indicate that the green light is about to change to red, giving oncoming motorists time to stop before the light changes to red. However, the occasional failure of road users to comply with these traffic rules creates a significant safety hazard and may lead to serious accidents at intersections.

As such, there is a need for an improved traffic signaling system that advances safety and promotes compliance with traffic rules.

SUMMARY

According to certain embodiments, disclosed is traffic signaling system, comprising a traffic light, including: a rear housing, an inner light arrangement supported by the rear housing, and an outer light arrangement supported by the rear housing and bordering the inner light arrangement, wherein the inner light arrangement comprises a red inner light, an amber inner light, and a green inner light which are linearly arranged, the outer light arrangement comprises at least one tube light which frames around the inner light arrangement; and wherein at least one inner light in the inner light arrangement illuminates simultaneously with the tube light of the outer light arrangement. In some embodiments, the outer light arrangement comprises a red tube light, wherein the red tube light in the outer light arrangement illuminates simultaneously with the red inner light in the inner light arrangement. In some embodiments, the outer light arrangement further comprises a green tube light, wherein the green tube light in the outer light arrangement illuminates simultaneously with the green inner light in the inner light arrangement. In some embodiments, the outer light arrangement further comprises an amber tube light, wherein the amber tube light in the outer light arrangement illuminates simultaneously with the amber inner light in the inner light arrangement. In some embodiments, the outer light arrangement further comprises an amber tube light, wherein the amber tube light in the outer light arrangement illuminates simultaneously with the amber inner light in the inner light arrangement. In some embodiments, one of the inner lights of the inner light arrangement illuminates simultaneously with one of the tube lights of a corresponding color of the outer light arrangement during an active state for said corresponding color, to the exclusion of the other colors. In some embodiments, during an active state of a given color, the inner light of the inner light arrangement and the tube light of the corresponding color in the outer light arrangement flash simultaneously, then illuminate simultaneously and continuously.

According to certain embodiments, the traffic signaling system comprises a traffic light that includes a rear housing, an inner light arrangement supported by the rear housing, and an outer light arrangement supported by the rear housing and bordering the inner light arrangement. In embodiments, the inner light arrangement comprises a red inner light, an amber inner light, and a green inner light which are linearly arranged. The outer light arrangement comprises at least one of a red tube light, an amber tube light, and a green tube light. In certain embodiments, an inner light in the inner light arrangement illuminates simultaneously with a tube light of a matching color in the outer light arrangement during an active state for the respective color. In some embodiments, the inner light of the inner light arrangement illuminates continuously during the active state while the tube light of the matching color in the outer light arrangement flashes for at least a part of the activate state. In other embodiments, the inner light of the inner light arrangement and the tube light of the corresponding color in the outer light arrangement flash simultaneously for at least a part of the activate state, then illuminate simultaneously and continuously during the active state.

In some embodiments, the outer light arrangement includes the red tube light, the amber tube light, and the green tube light in a nested arrangement. In certain embodiments, the red tube light, the amber tube light, and the green tube light each outline a rectangle profile. In some embodiments, the red tube light, the amber tube light, and the green tube light each comprise a single continuous piece which frames around the entire inner light arrangement. In some embodiments, the red tube light has a thickness which is greater than a thickness of the amber tube light and a thickness of the green tube light. In some further embodiments, the thickness of the amber tube light is greater than the thickness of the green tube light. In some embodiments, the green tube light is the innermost light of the outer light arrangement and is positioned between the inner light arrangement and the amber light, the red tube light is the outermost light of the outer light arrangement, with the amber tube light being nested between the red tube light and the green tube light.

In certain embodiments, during an active state of the red light, the inner red light flashes then illuminates continuously, while the red tube light illuminates continuously throughout the active state of the red light. In some further embodiments, the inner red light flashes twice before illuminating continuously. In some embodiments, during an active state of the amber light, the inner amber light flashes then illuminates continuously, while the amber tube light illuminates continuously throughout the active state of the amber light. In some further embodiments, the inner amber light flashes once before illuminating continuously. In some embodiments, during an active state of the green light, the inner green light flashes then illuminates continuously, while the green tube light illuminates continuously throughout the active state of the green light. In some further embodiments, the inner green light flashes once before illuminating continuously.

In certain embodiments, during an active state of the red light, the inner red light and the red tube light flash twice simultaneously then illuminate simultaneously and continuously throughout said active state of the red light. In some embodiments, each flash of the inner red light and the red tube light has a duration of about ¼ of a second. In certain embodiments, during an active state of the amber light, the inner amber light and the amber tube light flash once simultaneously then illuminate simultaneously and continuously throughout said active state of the amber light. In some embodiments, the inner amber light and the amber tube light flash for about ¼ of a second before illuminating continuously. In certain embodiments, during an active state of the green light, the inner green light and the green tube light flash once simultaneously then illuminate simultaneously and continuously throughout said active state of the green light. In some embodiments, the inner green light and the green tube light flash for about ¼ of a second before illuminating continuously.

In some embodiments, the red inner light, the amber inner light, and the green inner light are vertically arranged with the red inner light positioned above the amber inner light, and the amber inner light positioned above the green inner light. In certain embodiments, each of the red inner light, the amber inner light, and the green inner light is framed by a hood. In some embodiments, the hood of each of the red inner light, the amber inner light, and the green inner light has a bottom gap. In some embodiments, each of the red inner light, the amber inner light, and the green inner light has a generally square or rectangular geometry.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
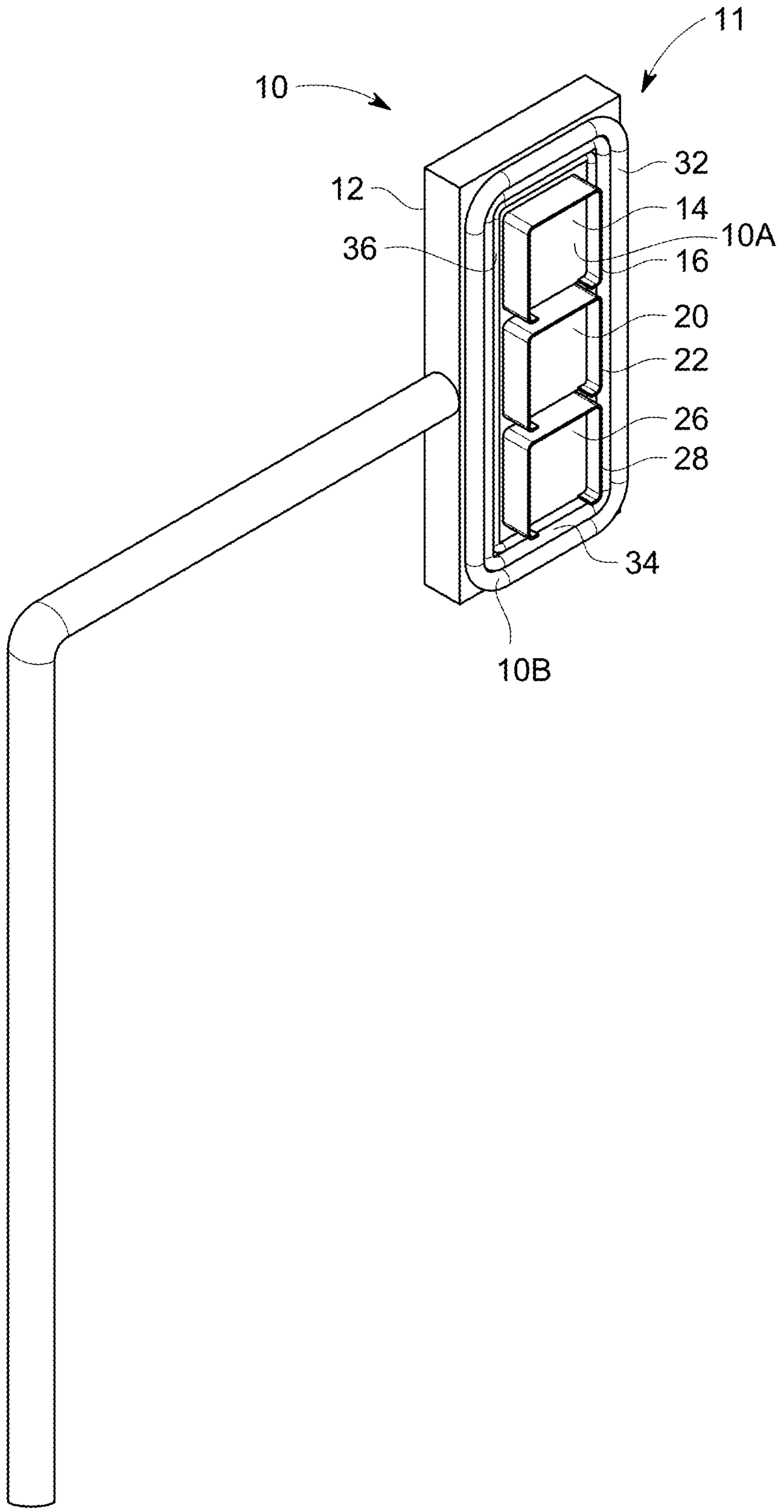
FIG. 1 is a perspective view of a traffic light of a traffic signaling system shown installed, according to certain embodiments.
Figure 2:
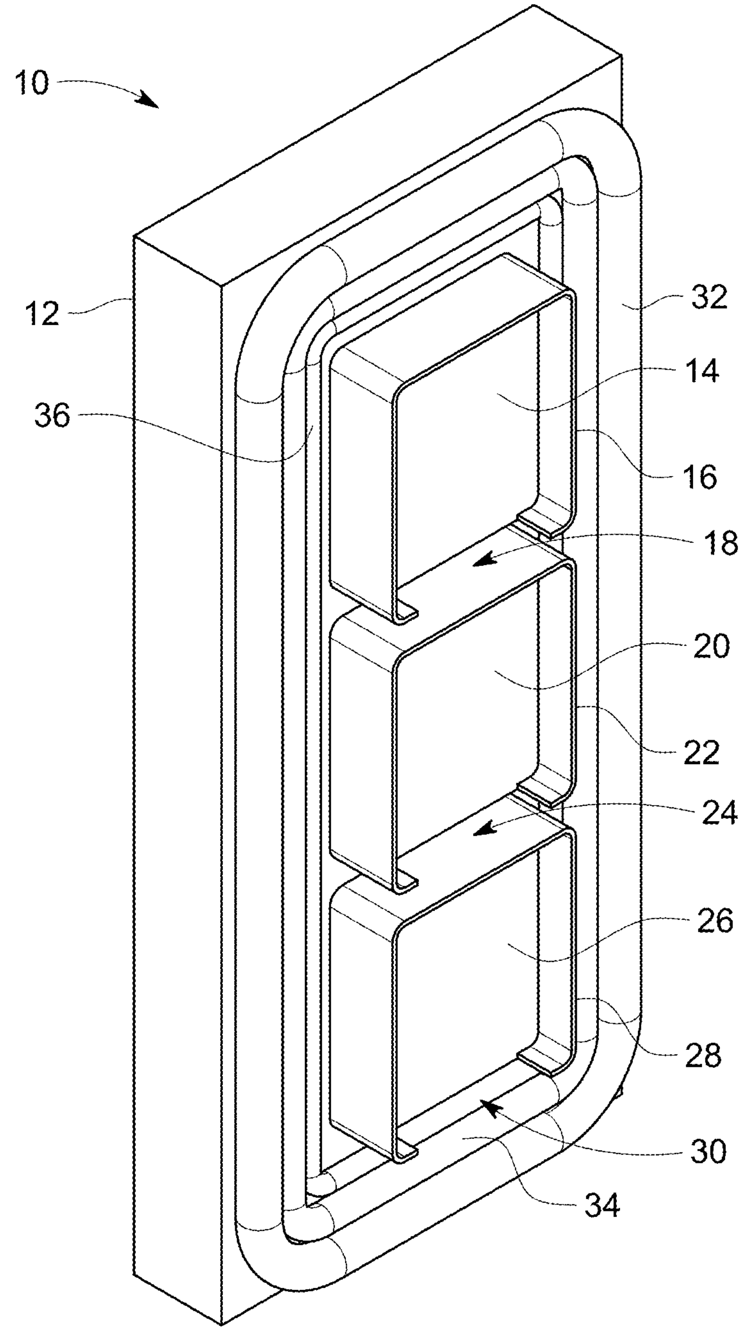
FIG. 2 is a perspective view of the traffic light.
Figure 3:
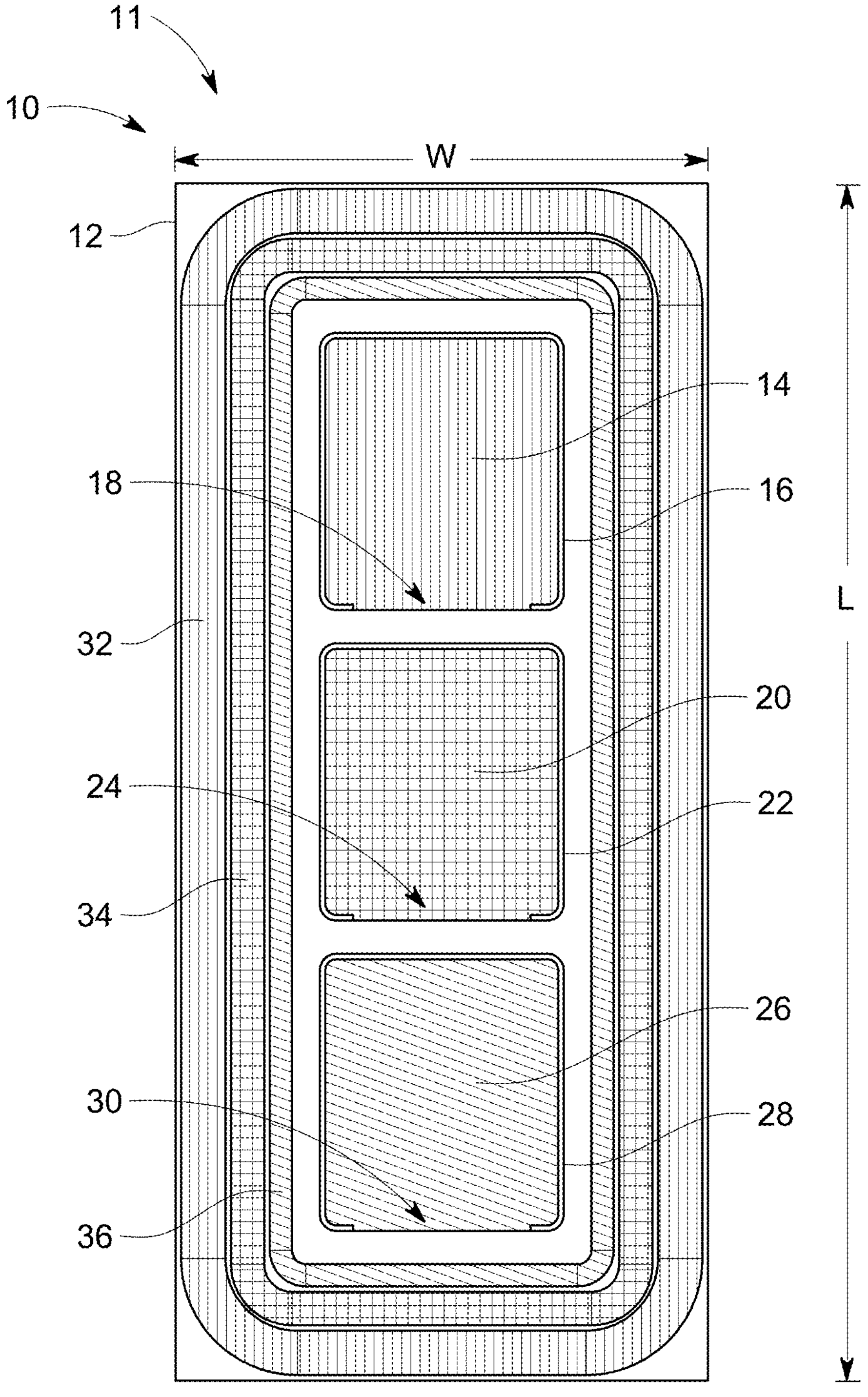
FIG. 3 is a front view of the traffic light with colors indicated.
Figure 4:
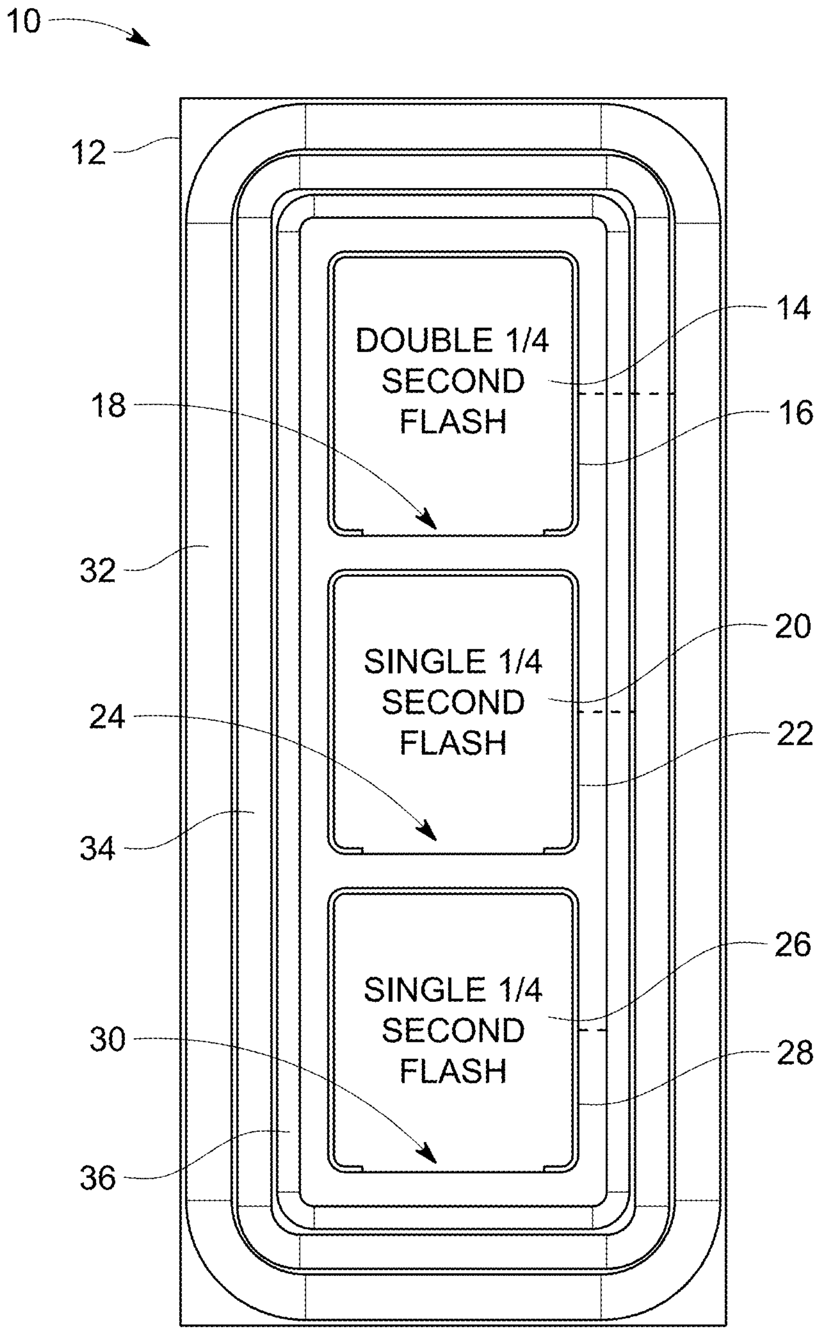
FIG. 4 is a schematic view of the traffic light, illustrating exemplary pulse patterns of the system according to certain embodiments.

According to various embodiments as depicted in FIGS. 1-4 disclosed is a traffic signaling system 11 comprising a traffic light 10 with enhanced safety features designed to increase motorist attention and awareness of the communicated signals. In certain embodiments, traffic light 10 may generally include a rear housing 12 supporting an inner light arrangement 10A and an outer light arrangement 10B. In some embodiments, rear housing 12 may be a shell made of plastic, aluminum, and/or other suitable material, and houses the various electrical, lighting, and/or computer/processing components of traffic signaling system 11 (e.g., electrical wiring, LED lights, LED driver for powering the LED lights, processing unit, etc.). In some embodiments, traffic signaling system 11 may utilize one or more components of a pre-existing traffic light, such as a pre-existing power supply, support pole, micro-processor, etc. In some embodiments, system 11 may incorporate a solar power element. In certain embodiments, the general design of inner light arrangement 10A may be similar to that of conventional traffic lights, but not necessarily so. In one embodiment, traffic light 10 incorporating both inner light arrangement 10A and outer light arrangement may be approximately of the same size as a conventional traffic light.

In certain embodiments, inner light arrangement 10A may comprise a red inner light 14, an amber inner light 20, and a green inner light 26. In certain embodiments, the inner lights may be linearly and/or vertically arranged, with red inner light 14 on top, amber inner light 20 in the middle, and green inner light 26 on the bottom as with conventional traffic light systems. In some embodiments, red inner light 14 may be framed by a hood 16 (also referred to as "red light hood 16"); amber inner light 20 may also be framed by a hood 22 (also referred to as "amber light hood 22"); and green inner light 26 may likewise be framed by a hood 28 (also referred to as "green light hood 28"). In one embodiment, inner lights 14, 20, and 26, and hoods 16, 22, and 28, may each have a generally square or rectangular geometry, but are not limited to this option. In some embodiments, red light hood 16 may frame around the top, sides, and bottom corners of red inner light 14, leaving a red-light bottom hood gap 18. Amber light hood 22 may likewise frame around the top, sides, and bottom corners of amber inner light 20, leaving an amber light bottom hood gap 24. Green light hood 28 may likewise frame around the top, sides, and bottom corners of green inner light 26, leaving a green light bottom hood gap 30. Hood gaps 18, 24, and 30 may be beneficial in deterring birds from nesting within hoods 16, 22, and 28. In some alternate embodiments, hood gaps may be provided on the top of hoods 16, 22, and 28, instead of, or in addition to the bottom hood gaps. In some alternate embodiments, hoods 16, 22, and 28 may incorporate bird deterrent surfaces. It shall be appreciated, that inner light arrangement 10A, inner lights 14, 20, 26, and/or hoods 16, 22, 28 may have different geometric configurations and may be of different sizes, dimensions, and arrangement orders in alternate embodiments.

In certain embodiments, outer light arrangement 10B may comprise at least one tube light which borders or runs parallel to a perimeter of inner light arrangement 10A. In certain embodiments, outer light arrangement 10B may comprise a red tube light 32, an amber tube light 34, and/or a green tube light 36. In certain embodiments, outer light arrangement 10B may comprise all three lights provided in a nested and/or substantially concentric arrangement as shown. In further embodiments, each light may entirely frame inner light arrangement 10A, wherein each tube lights has a rectangular geometry that runs parallel to the entire perimeter of the inner light arrangement 10A. In certain embodiments, red tube light 32, amber tube light 34, and/or green tube light 36 may comprise a single continuous piece. However, in other embodiments, red tube light 32, amber tube light 34, and/or green tube light 36 may be comprise multiple tube light pieces.

According to an exemplary embodiment as depicted in the figures, outer light arrangement 10B comprises red tube light 32, amber tube light 34, and green tube light 36, wherein green tube light 36 is the innermost light and is immediately adjacent inner light arrangement 10A, red tube light 32 is the outermost light, and amber tube light 34 is located between red tube light 32 and green tube light 36. Additionally, tube lights 32, 34, and 36 are each formed from a single continuous piece which frames around the entire rectangular perimeter outlined by inner light arrangement 10A. Furthermore, red tube light 32 is wider than the amber and green tube lights 34, 36 for greater prominence. In further embodiments, amber tube light 34 is also wider than green tube light 36 to enhance its prominence as well.

According to an exemplary embodiment, traffic light 10 may have a length "L" of about 51 inches to about 54 inches, and a width "W" of about 24 inches, thus having a surface area approximately equal to that of certain convention traffic lights. Furthermore, each of inner lights 14, 20, and 26 may be about 12.5 inches in length, and about 11 inches in width with rounded corners. As such, each inner light has a surface area of about 137.5 square inches which is an increase of about 42.5 square inches over certain conventional lights. In an alternate embodiment, each of inner lights 14, 20, and 26 may be about 9 inches in length, and about 9 inches in width. In a further alternate embodiment, each inner light may be circular rather than square.

In certain embodiments, inner lights 14, 20, and 26 may further be framed by hoods 16, 22, and 28, respectively. According to an exemplary embodiment, each hood may have a width of about 0.5 inches and depth of about 9 inches. In certain embodiments, hood gaps 18, 24, and 30 provide a bottom opening of about 8 inches, thus leaving very little space for birds to nest within the hoods. In some embodiments, red tube light 32 may be an LED tube that is about 2 inches wide and provides an illuminated surface area of approximately 296 square inches. Amber tube light 34 may be an LED tube that is about 1.5 inches wide and provides an illuminated surface area of about 221.5 square inches. Green tube light 36 may be an LED tube that is about 1 inch wide and provides an illuminated surface area of about 150.5 square inches. Thus, the total surface areas of inner lights and tube lights for each color provide overall visible surface area increase in comparison to certain conventional lights of about 456% for the red light, about 377% for the amber light, and about 300% for the green light. The inner lights 14, 20 and 26, and LED tube lights 32, 34, and 36, may be arranged with a small amount of spacing between the lights. According to an exemplary embodiment, tube lights 32, 34, and 36 may be spaced from one another by a gap of approximately 0.25 inches. Inner lights 14, 20, and 26 may be spaced from one another by a gap of approximately 1.5 inches, and the gap between an inner side of green tube light 36 and inner light arrangement 10A may be approximately between 1.25 inches and 1 inch. According to an exemplary embodiment, traffic light 10 may preferably be coated with a white finish which is resistant to extreme temperatures, fading, or cracking. It shall be appreciated that different coatings and colors may be used in alternate embodiments. It shall be appreciated that the size, dimensions, and/or relative spacing of traffic light 10 and its components may vary in alternate embodiments.

In certain embodiments, traffic signaling system 11 operates by illuminating one of the inner lights together with the tube light of the same color simultaneously throughout a set time duration defining an active state for that color. For example, inner red light 14 and red tube light 32 illuminate together during the active state for the red light. As such, the color of the light signal is seen both in inner light arrangement 10A and outer light arrangement 10B for the set time duration associated with the red light active state. Likewise inner amber light 20 and amber tube light 34 illuminate together during the active state for the amber light, and inner green light 26 and green tube light 36 illuminate together during the active state for the green light. It shall be understood that the time duration of the active state is not necessarily the same for each color. For example, the active sate for the amber light may be shorter than the active state for the red light and/or the active state for the green light. It shall be understood that simultaneous illumination of lights of a given color does not necessarily mean that both lights are illuminated continuously throughout the set time duration for the color's active state. As some non-limiting examples, during the red-light active state, inner red light 14 may illuminate continuously, while red tube light 32 may flash for at least part of the red light active state, and vice versa; or both inner red light 14 and red tube light 32 may illuminate continuously; or both inner red light 14 and red tube light 32 may flash for at least part of the red light active state either in sync or out of sync. As such, one or both of the simultaneously activated lights may illuminate continuously throughout or partially throughout the active state for the given color. In further embodiments, one or both of the simultaneously activated lights may flash for at least a part of the active state of the given color. In certain embodiments, each of inner lights 14, 20, and 26 may flash when initially activated then illuminate continuously throughout the respective light's active state, while the respective corresponding tube light remains continuously illuminated during the active state. According to an exemplary embodiment, during the green light active state, both inner green light 26 and green tube light 36 activate, with inner green light initially flashing once for about 0.25 seconds before reverting to a continuous illumination. Thereafter, amber inner 20 and amber tube light 34 activate, with amber inner light initially flashing once at about 0.25 seconds. Thereafter, red inner light 14 and red tube light 32 activate, with red inner light 32 initially flashing twice at about 0.25 seconds per flash. It shall be appreciated that the number of flashings for each of the inner lights may vary in alternate embodiments. In embodiments, the active state time duration may be, for example, less than a minute, about a minute, or more than a minute depending on factors such as the color of the light (e.g., amber light may be activated for a shorter time than the red and green lights as is commonly practiced), traffic flow rates, time of day, conditions of the intersection, etc. In one embodiment, the amber light may illuminate for 1 second for each 10 miles per hour speed limit (i.e., 3.5 seconds for a 35 MHP zone, 4.5 seconds for a 45 MPH zone, 6 seconds for a 60 MPH zone, etc.). Additionally, the different colored lights are activated in a specific cycle order, wherein each color is activated for the time duration associated with that color. The cycle order may be, for example, green, then amber, then red, as is commonly practiced.

As such, the disclosed subject matter provides an improved streetlight that provides much greater illumination in comparison to conventional systems. In some embodiments, outer lighting arrangement 10B and inner lighting arrangement 10A may require about the same space as a conventional streetlight but provide up to about 300% or beyond about 400% more illumination depending on the color signal displayed. This is particularly beneficial for drivers with poor vision, and/or elderly drivers. The enhanced illumination with added tube lights is further beneficial in capturing the attention of drivers and helping to prevent drivers from running red lights. These benefits are further advanced by the flashing light pulses which are also believed effective in capturing the driver's attention.

It shall be appreciated that the disclosed device and system can have multiple configurations in different embodiments. For example, in some alternate embodiments, traffic light 10 may be horizontally oriented. It shall be appreciated that color shades of the different lighting elements of the system may vary in alternate embodiments, and that the tube light color may not necessarily be an exact match of the inner light color for any given light signal color in certain embodiments. It shall be appreciated that the device and system described herein may comprise any alternative known materials in the field and be of any color, size, and/or dimensions. It shall be appreciated that the device may be manufactured and assembled using any known techniques in the field.

As used herein, the colors red, green, and amber each encompass various shades associated with the respective color and/or colors which are close on the spectrum to the given color but which will have the same signal meaning to motorists. For example, green may encompass certain bluish shades; amber may encompass certain orange shades, etc.

It shall be understood that terms such as “border,” “frame,” “run parallel to,” and similar terms as used herein, do not imply an entire and/or continuous enclosure. For example, an object described as bordering, or running parallel to another object may have one or more gaps (such as hoods 16, 22, and 28), or may run parallel to one or more limited segment(s) along a perimeter of the border. It shall be understood that the term rectangle as used herein includes a square. It shall be understood that the term rectangle as used herein encompasses geometric shapes with rounded corners and with sharp corners. It shall be understood that the orientation or positional relationship indicated by terms such as “upper”, “lower”, “front”, “rear”, “left”, “right”, “top”, “bottom”, “inside”, “outside” may base on the orientation or positional relationship shown in the accompanying drawings, and may be only for convenience and simplification of describing the disclosed subject matter, unless indicated otherwise. As such, such terms should not be construed as indicating or implying that the indicated device or element must have a specific orientation or are constructed and operated in a specific orientation, and therefore should not be construed as a limitation of the present invention unless indicated otherwise.

As used herein, the articles “a” and “an” are intended to include one or more items, and may be used interchangeably with “one or more.” Where only one item is intended, the term “one” or similar language is used. Also, as used herein, the terms “has”, “have”, “having”, “with” or the like are intended to be open-ended terms. Further, the phrase “based on” is intended to mean “based, at least in part, on” unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as ‘approximate,’ ‘approximately,’ ‘about,’ etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A traffic signaling system, comprising:

a traffic light, including:

a rear housing, an inner light arrangement supported by the rear housing, and an outer light arrangement supported by the rear housing and bordering the inner light arrangement, wherein the inner light arrangement comprises a red inner light, an amber inner light, and a green inner light which are linearly arranged, the outer light arrangement comprises a plurality of tube lights which each frame around the inner light arrangement in a nested arrangement; and wherein each of the inner lights in the inner light arrangement illuminates simultaneously with one of the plurality of tube lights of the outer light arrangement.

2. The traffic signaling system of claim 1, wherein the outer light arrangement comprises a red tube light, wherein the red tube light in the outer light arrangement illuminates simultaneously with the red inner light in the inner light arrangement.

3. The traffic signaling system of claim 2, wherein the outer light arrangement further comprises a green tube light, wherein the green tube light in the outer light arrangement illuminates simultaneously with the green inner light in the inner light arrangement.

4. The traffic signaling system of claim 2, wherein the outer light arrangement further comprises an amber tube light, wherein the amber tube light in the outer light arrangement illuminates simultaneously with the amber inner light in the inner light arrangement.

5. The traffic signaling system of claim 3, wherein the outer light arrangement further comprises an amber tube light, wherein the amber tube light in the outer light arrangement illuminates simultaneously with the amber inner light in the inner light arrangement.

6. The traffic signaling system of claim 5, wherein one of the inner lights of the inner light arrangement illuminates simultaneously with one of the tube lights of a corresponding color of the outer light arrangement during an active state for said corresponding color, to the exclusion of the other colors.

7. The traffic signaling system of claim 6, wherein during an active state of a given color, the inner light of the inner light arrangement and the tube light of the corresponding color in the outer light arrangement flash simultaneously, then illuminate simultaneously and continuously.

8. The traffic signaling system of claim 5, wherein the red tube light, the green tube light, and the amber tube light each frame an entire perimeter of the inner light arrangement.

9. The system of claim 8, wherein each of the red inner light, the amber inner light, and the green inner light is framed by a hood.

10. The system of claim 9, wherein the hood of each of the red inner light, the amber inner light, and the green inner light has a bottom gap.

11. The system of claim 1, wherein each of the red inner light, the amber inner light, and the green inner light has a generally square or rectangular geometry.

12. The system of claim 1, wherein the plurality of tube lights of the outer light arrangement comprise a red tube light, an amber tube light, and a green tube light in the nested arrangement.

13. The system of claim 12, where the red tube light, the amber tube light, and the green tube light each outline a rectangle profile.

14. The system of claim 12, where the red tube light, the amber tube light, and the green tube light each comprise a single continuous piece in framing relationship to the inner light arrangement.

15. The system of claim 12, wherein the green tube light is the innermost light of the outer light arrangement and is positioned between the inner light arrangement and the amber light, the red tube light is the outermost light of the outer light arrangement, the amber tube light being nested between the red tube light and the green tube light.

16. The system of claim 1, wherein the red inner light, the amber inner light, and the green inner light are vertically arranged with the red inner light positioned above the amber inner light, and the amber inner light positioned above the green inner light.

* * * * *